(12) United States Patent
Ling

(10) Patent No.: US 12,500,950 B2
(45) Date of Patent: Dec. 16, 2025

(54) METHOD, DEVICE, AND COMPUTER PROGRAM PRODUCT FOR TRANSMISSION OF REPLICATED DATA

(71) Applicant: Dell Products L.P., Round Rock, TX (US)

(72) Inventor: Qinghua Ling, Beijing (CN)

(73) Assignee: Dell Products L.P., Round Rock, TX (US)

( * ) Notice: Subject to any disclaimer, the term of this patent is extended or adjusted under 35 U.S.C. 154(b) by 3 days.

(21) Appl. No.: 18/618,245

(22) Filed: Mar. 27, 2024

(65) Prior Publication Data

US 2025/0106284 A1    Mar. 27, 2025

(30) Foreign Application Priority Data

Sep. 27, 2023   (CN) .......................... 202311264930.3

(51) Int. Cl.
H04L 67/1095   (2022.01)
G06F 16/182   (2019.01)

(52) U.S. Cl.
CPC ...... *H04L 67/1095* (2013.01); *G06F 16/1844* (2019.01)

(58) Field of Classification Search
CPC .. G06F 16/1844; G06F 16/184; G06F 16/182; H04L 67/1095
See application file for complete search history.

(56) References Cited

U.S. PATENT DOCUMENTS

| | | | |
|---|---|---|---|
| 6,134,585 A * | 10/2000 | Yamato | H04N 21/2393 348/E5.008 |
| 9,025,602 B2 | 5/2015 | Zhong et al. | |
| 9,779,138 B2 * | 10/2017 | Curewitz | G06F 16/24569 |
| 11,178,091 B1 * | 11/2021 | Madhavan | H04L 47/622 |
| 12,299,061 B1 * | 5/2025 | Sharma | G06F 16/9024 |
| 2009/0195542 A1 * | 8/2009 | Kawamura | G09G 5/14 345/422 |
| 2014/0059298 A1 * | 2/2014 | Olin | G06F 12/08 711/143 |
| 2018/0159952 A1 * | 6/2018 | Feng | G06F 9/4843 |
| 2020/0341861 A1 | 10/2020 | Ling et al. | |
| 2021/0133206 A1 | 5/2021 | Gu et al. | |
| 2021/0286557 A1 * | 9/2021 | Kim | G06F 3/0679 |
| 2022/0334927 A1 * | 10/2022 | Haravu | G06F 11/1451 |
| 2024/0338143 A1 | 10/2024 | Ling et al. | |
| 2024/0394261 A1 * | 11/2024 | Moorthy | G06F 16/24568 |
| 2025/0123929 A1 * | 4/2025 | Thomsen | G06F 11/1451 |
| 2025/0156236 A1 * | 5/2025 | Wang | G06F 3/0659 |

\* cited by examiner

*Primary Examiner* — Jason D Cardone
(74) *Attorney, Agent, or Firm* — BainwoodHuang

(57) ABSTRACT

Techniques for transmission of replicated data involve acquiring the replicated data from a storage space based on a plurality of replication requests in a replication queue. Such techniques further involve determining whether the plurality of replication requests are added to a plurality of transmission queues from the replication queue. Such techniques further involve removing the plurality of replication requests from the replication queue in response to the plurality of replication requests being added to the plurality of transmission queues from the replication queue. Such techniques further involve transmitting the replicated data to a plurality of target devices based on the plurality of replication requests in the plurality of transmission queues.

20 Claims, 8 Drawing Sheets

METHOD, DEVICE, AND COMPUTER PROGRAM PRODUCT FOR TRANSMISSION OF REPLICATED DATA

CROSS-REFERENCE TO RELATED APPLICATION

This application claims priority to Chinese Patent Application No. CN202311264930.3, on file at the China National Intellectual Property Administration (CNIPA), having a filing date of Sep. 27, 2023, and having "METHOD, DEVICE AND COMPUTER PROGRAM PRODUCT FOR TRANSFERRING FOR REPLICATION DATA" as a title, the contents and teachings of which are herein incorporated by reference in their entirety.

TECHNICAL FIELD

The present disclosure relates to the field of data storage, and more particularly, to a method, a device, and a computer program product for transmission of replicated data.

BACKGROUND

As the storage technology continues to develop, the capability of storing data for long periods of time continues to improve. Benefiting from the development of storage media, data recovery, and other technologies, servers generally do not lose data and cause business interruptions in the face of downtime, power outages, and other common failures, thus ensuring the stability of data.

However, in major disasters such as earthquakes and fires, a single server often cannot guarantee the stability of data, and for this reason, it is necessary to back up the data in the server to other servers or clusters. When data in a certain server is corrupted, other servers or clusters can quickly replace that server and continue to conduct relevant business. Therefore, it is important to replicate data to other devices to ensure the stability of the data.

SUMMARY OF THE INVENTION

Embodiments of the present disclosure propose a method, a device, and a computer program product for transmission of replicated data. In embodiments of the present disclosure, a plurality of replication requests can be cached simultaneously by one replication queue, and replicated data corresponding to the plurality of replication requests can be acquired from a storage space. The plurality of replication requests may then be added to a plurality of transmission queues, and it may be determined whether the plurality of replication requests in the replication queue have all been added to a plurality of transmission queues. If the plurality of replication requests have all been added to the plurality of transmission queues, the plurality of replication requests can be removed from the replication queue to release the occupied space. In addition, the replicated data may be transmitted to a target device via a replication request in the transmission queue. In this way, it is not necessary to set a corresponding replication queue separately for each transmission queue, which can reduce the internal units to save the space occupied by the replication queue, so more space can be allocated to the transmission queues to ensure that the transmission queues can be allocated a larger buffer capacity in medium- and high-delay network environments, and the completion of the replication request can be independent of the feedback of the target device after receiving the replicated data, thus avoiding the congestion of requests of the replication queue in medium- and high-delay network environments, thereby improving the adaptability to different network environments, and improving the transmission efficiency and quality of the replicated data.

In a first aspect of embodiments of the present disclosure, a method for transmission of replicated data is provided. The method includes: acquiring the replicated data from a storage space based on a plurality of replication requests in a replication queue. The method further includes: determining whether the plurality of replication requests are added to a plurality of transmission queues from the replication queue. The method further includes: removing the plurality of replication requests from the replication queue in response to the plurality of replication requests being added to the plurality of transmission queues from the replication queue. The method further includes: transmitting the replicated data to a plurality of target devices based on the plurality of replication requests in the plurality of transmission queues.

In a second aspect of the embodiments of the present disclosure, an electronic device is provided. The electronic device includes one or more processors; and a storage apparatus for storing one or more programs, wherein the one or more programs, when executed by the one or more processors, cause the one or more processors to implement a method for transmission of replicated data, the method including: acquiring the replicated data from a storage space based on a plurality of replication requests in a replication queue. The method further includes: determining whether the plurality of replication requests are added to a plurality of transmission queues from the replication queue. The method further includes: removing the plurality of replication requests from the replication queue in response to the plurality of replication requests being added to the plurality of transmission queues from the replication queue. The method further includes: transmitting the replicated data to a plurality of target devices based on the plurality of replication requests in the plurality of transmission queues.

In a third aspect of embodiments of the present disclosure, a computer-readable storage medium is provided on which a computer program is stored, where the program, when executed by a processor, implements a method for transmission of replicated data, the method including: acquiring the replicated data from a storage space based on a plurality of replication requests in a replication queue. The method further includes: determining whether the plurality of replication requests are added to a plurality of transmission queues from the replication queue. The method further includes: removing the plurality of replication requests from the replication queue in response to the plurality of replication requests being added to the plurality of transmission queues from the replication queue. The method further includes: transmitting the replicated data to a plurality of target devices based on the plurality of replication requests in the plurality of transmission queues.

It should be understood that the content described in the Summary of the Invention part is neither intended to limit key or essential features of the embodiments of the present disclosure, nor intended to limit the scope of the present disclosure. Other features of the present disclosure will become readily understood from the following description.

BRIEF DESCRIPTION OF THE DRAWINGS

The above and other features, advantages, and aspects of the embodiments of the present disclosure will become more apparent with reference to the accompanying drawings and the following detailed description. In the accompanying drawings, identical or similar reference numerals represent identical or similar elements, in which.

DETAILED DESCRIPTION

Figure 1:
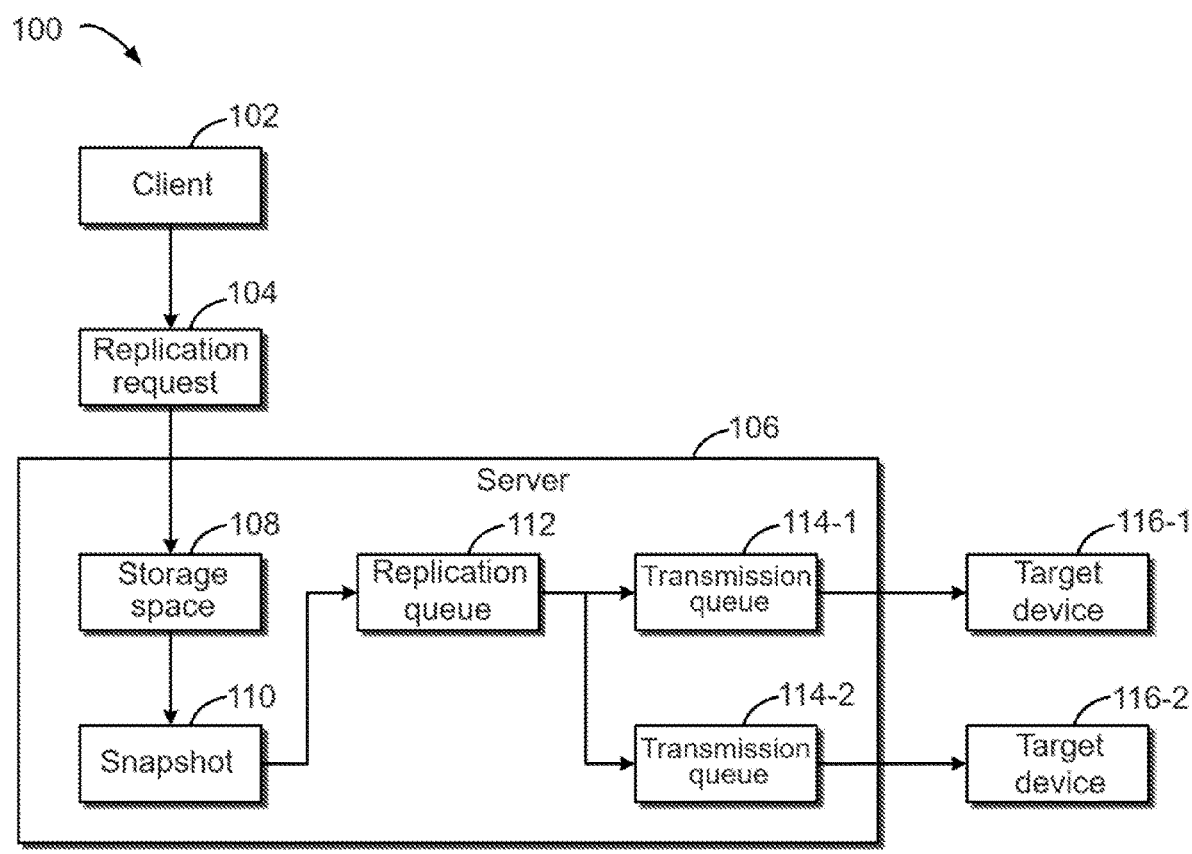
FIG. 1 illustrates a schematic diagram of an example environment in which some embodiments of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described below in further detail with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the scope of protection of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In order to improve the stability and durability of data storage, it is generally necessary to back up the data in a source storage device to a destination storage device. Therefore, the data in the source storage device needs to be replicated to the destination storage device in a timely manner. Conventionally, data in the source storage device is replicated to the destination storage device by means of synchronous replication or asynchronous replication. However, in scenarios where data needs to be replicated to a plurality of destination storage devices, simple synchronous replication or asynchronous replication has a high demand for occupying the space of the source storage device and is susceptible to network delays.

For this reason, embodiments of the present disclosure provide a method for replicated data. A plurality of replication requests can be cached simultaneously by one replication queue, and replicated data corresponding to the plurality of replication requests can be acquired from a storage space. The plurality of replication requests may then be added to a plurality of transmission queues, and it may be determined whether the plurality of replication requests in the replication queue have all been added to a plurality of transmission queues. If the plurality of replication requests have all been added to the plurality of transmission queues, the plurality of replication requests can be removed from the replication queue to release the occupied space. In addition, the replicated data may be transmitted to a target device via a replication request in the transmission queue.

In this way, it is not necessary to set a corresponding replication queue separately for each transmission queue, which can reduce the internal units to save the space occupied by the replication queue, so more space can be allocated to the transmission queues to ensure that the transmission queues can be allocated a larger buffer capacity in medium- and high-delay network environments, and the completion of the replication request can be independent of the feedback of the target device after receiving the replicated data, thus avoiding the congestion of requests of the replication queue in medium- and high-delay network environments, thereby improving the adaptability to different network environments, and improving the transmission efficiency and quality of the replicated data.

FIG. 1 illustrates a schematic diagram of an example environment 100 in which some embodiments of the present disclosure may be implemented. Referring to FIG. 1, the environment 100 includes a client 102, a server 106, a target device 116-1, and a target device 116-2, wherein the client 102 may be a user terminal, a mobile device, a computer, etc., the server 106, the target device 116-1, and the target device 116-2 may be a computing system, a single server, a distributed server, or a cloud-based server, the server 106 may serve as a source storage device, and the target device 116-1 and the target device 116-2 may serve as destination storage devices for backing up data in the server 106. It is noted that the target device 116-1 and the target device 116-2 are merely an example of the present disclosure and not a limitation to the number of target devices.

Still refer to FIG. 1, in the process of using the client 102, a user may generate operations such as modifications, deletions, etc., to the data stored in the server 106, at which time a replication request 104 (which may be referred to as an initial replication request) is generated. This replication request 104 may be directed to a storage space 108 where data modifications, deletions, and the like are generated, and the server 106 may then read a snapshot 110 (which may be referred to as replicated data) in that storage space 108 in accordance with the replication request 104. A plurality of replication requests 104 may exist in the replication queue 112 at the same time, and the server 106 may process the plurality of replication requests 104 in the replication queue by means of parallel processing so as to read the snapshot 110.

Still refer to FIG. 1, a plurality of transmission queues such as a transmission queue 114-1 and a transmission queue 114-2 are provided in the server 106, wherein the transmission queues are used to process the replication requests 104 in order to transmit the snapshot 110 to a plurality of target devices such as the target device 116-1 and the target device 116-2. After the plurality of replication requests 104 are added to the replication queue 112, the server 106 adds the plurality of replication requests 104 separately to the transmission queue 114-1 and the transmission queue 114-2 by means of parallel processing. Moreover, after the plurality of replication requests 104 are added to the transmission queue 114-1 and the transmission queue 114-2 separately, the server 106 may confirm that the processing of the plurality of replication requests 104 in the replication queue 112 is completed, thereby removing the plurality of replication requests 104 in the replication queue 112 to release the cache space.

Still refer to FIG. 1, after the plurality of replication requests 104 are added separately to the transmission queue 114-1 and the transmission queue 114-2, the server 106 may send the snapshot 110 to the target device 116-1 via the replication request 104 in the transmission queue 114-1, and may also transmit the snapshot 110 to the target device 116-2 via the replication request 104 in the transmission queue 114-2. Moreover, the server 106 may process a set of replication requests in the transmission queue 114-1 or the transmission queue 114-2 by means of parallel processing, i.e., the server 106 not only may perform parallel processing on a plurality of transmission queues, but also may perform parallel processing on a set of replication requests in each transmission queue.

In some embodiments of the present disclosure, it is not necessary to set a corresponding replication queue separately for each transmission queue such as the transmission queue 114-1 and the transmission queue 114-2, which can reduce the internal units to save the space occupied by the replication queue, so more space can be allocated to the transmission queues to ensure that the transmission queues can be allocated a larger cache in medium- and high-delay network environments, and the completion of the replication request 104 can be independent of the feedback of the target device after receiving the replicated data, i.e., the snapshot 110, thus avoiding the congestion of requests of the replication queue 112 in medium- and high-delay network environments, thereby improving the adaptability to different network environments, and improving the transmission efficiency and quality of the replicated data.

Figure 2:
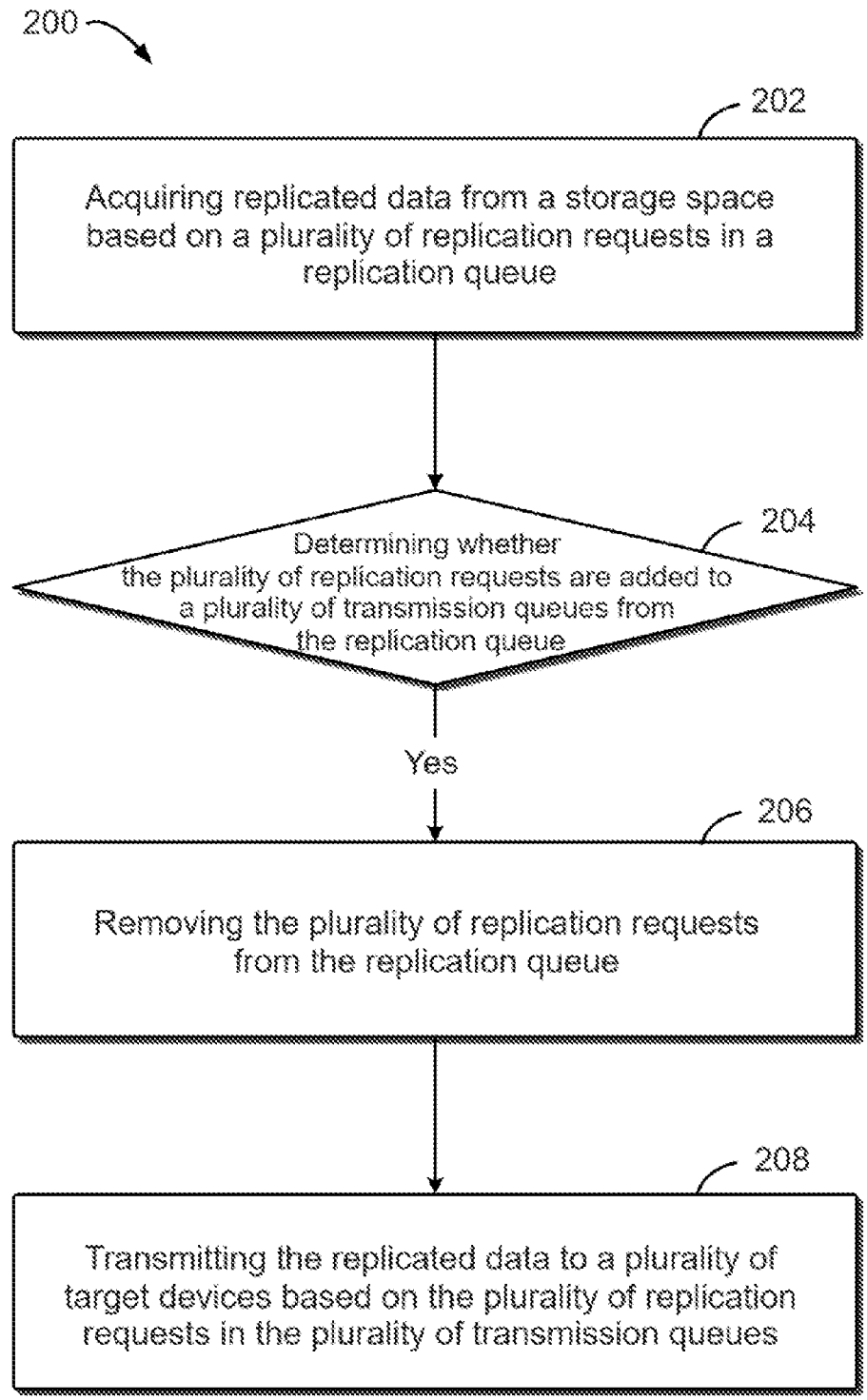
FIG. 2 illustrates a flow chart of a method for transmission of replicated data according to some embodiments of the present disclosure.

FIG. 2 illustrates a flow chart of a method 200 for transmission of replicated data according to some embodiments of the present disclosure. In some embodiments, the method 200 may be performed by the server 106 in FIG. 1. At block 202, replicated data is acquired from a storage space based on a plurality of replication requests in a replication queue. In some embodiments, in the environment 100 shown in FIG. 1, a plurality of replication requests 104 may exist in the replication queue 112 at the same time and, in the method 200, the plurality of replication requests 104 in the replication queue may be processed by means of parallel processing to read the snapshot 110 (which may be referred to as the replicated data) of the storage space 108.

At block 204, it is determined whether the plurality of replication requests are added to a plurality of transmission queues from the replication queue. In some embodiments, in the environment 100 shown in FIG. 1, after the plurality of replication requests 104 are added to the replication queue 112, the method 200 may add the plurality of replication requests 104 separately to the transmission queue 114-1 and the transmission queue 114-2 by way of parallel processing, and confirm whether the plurality of replication requests 104 have been separately added to the transmission queue 114-1 and the transmission queue 114-2.

At block 206, the plurality of replication requests are removed from the replication queue in the case where the plurality of replication requests are added to the plurality of transmission queues from the replication queue. In some embodiments, in the environment 100 shown in FIG. 1, after the plurality of replication requests 104 are added to the transmission queue 114-1 and the transmission queue 114-2 separately, the method 200 may confirm that the processing of the plurality of replication requests 104 in the replication queue 112 is completed, thereby removing the plurality of replication requests 104 in the replication queue 112 to release the cache space of the replication queue 112.

At block 208, the replicated data is transmitted to a plurality of target devices based on the plurality of replication requests in the plurality of transmission queues. In some embodiments, in the environment 100 shown in FIG. 1, after the plurality of replication requests 104 are added to the transmission queue 114-1 and the transmission queue 114-2 separately, the method 200 may send the snapshot 110 to the target device 116-1 via the replication request 104 in the transmission queue 114-1, and may also transmit the snapshot 110 to the target device 116-2 via the replication request 104 in the transmission queue 114-2. Moreover, the method 200 may process a set of replication requests in the transmission queue 114-1 or a set of replication requests in the transmission queue 114-2 by means of parallel processing, i.e., the method 200 not only may perform parallel processing on a plurality of transmission queues, but also may perform parallel processing on a set of replication requests in each transmission queue.

In this way, the method 200 does not need to set a corresponding replication queue separately for each transmission queue, which can reduce the internal units to save the space occupied by replication queue, so more space can be allocated to the transmission queues to ensure that the transmission queues can be allocated a larger buffer capacity in medium- and high-delay network environments, and the completion of the replication request can be independent of the feedback of the target device after receiving the replicated data, thus avoiding the congestion of requests of the replication queue in medium- and high-delay network environments, thereby improving the adaptability to different network environments, and improving the transmission efficiency and quality of the replicated data.

Figure 3:
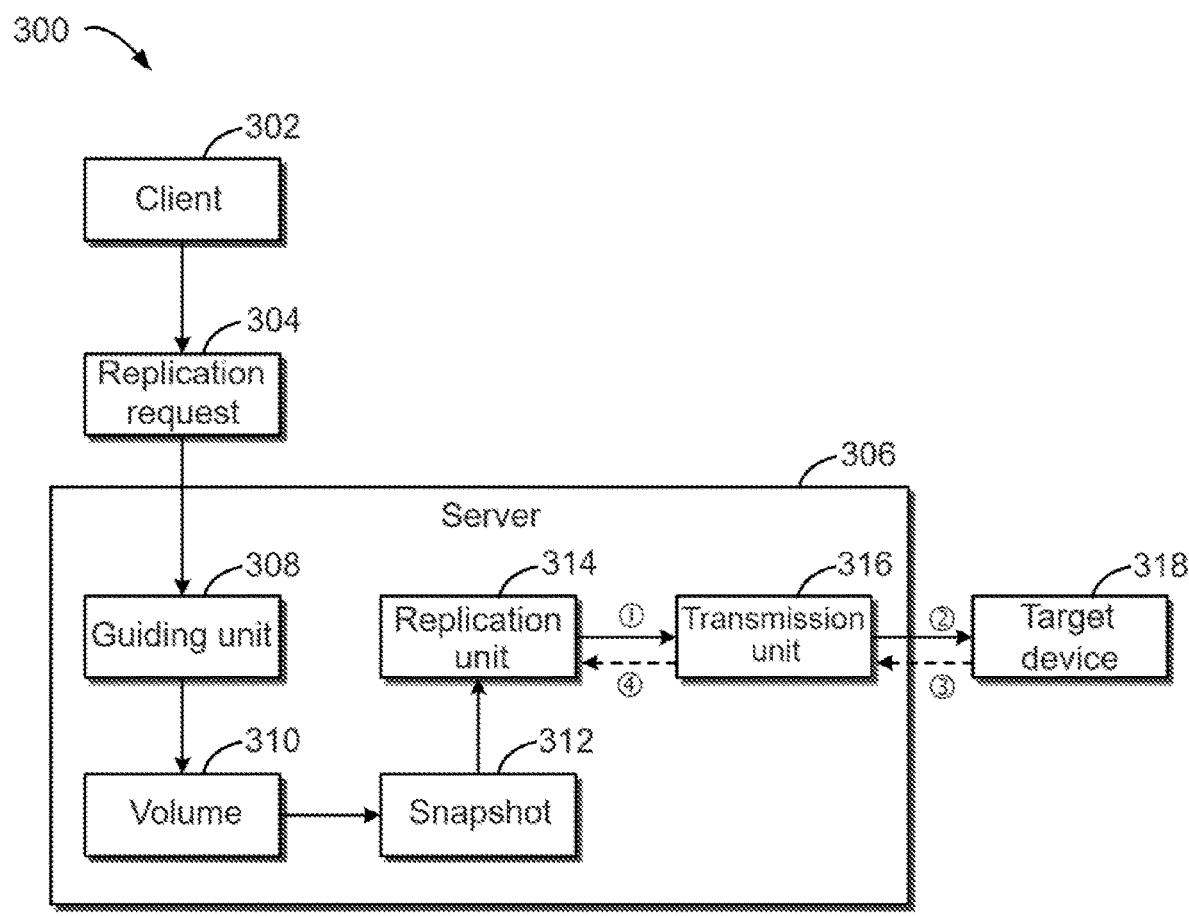
FIG. 3 illustrates a schematic diagram of a process of transmitting replicated data to one target device via one transmission unit according to some embodiments of the present disclosure.

FIG. 3 illustrates a schematic diagram of a process 300 of transmitting replicated data to one target device via one transmission unit according to some embodiments of the present disclosure. Referring to FIG. 3, in some embodiments, a replication request 304 is generated during use of a client 302, and a server 306 guides the replication request 304 to a volume 310 (which may be referred to as a storage space) by a guiding unit 308, so as to acquire a snapshot 312 (which may be referred to as replicated data) in the volume 310. A replication queue is provided in a replication unit 314 to cache a plurality of replication requests 304, and the replication unit 314 reads the snapshot 312 through the replication requests 304. In some embodiments, the snapshot 312 is real-time data in the volume 310. Alternatively or additionally, the snapshot 312 may also be difference data from the previously acquired snapshot.

Still refer to FIG. 3, the server 306 communicates with a target device 318 via a transmission unit 316, so as to send the snapshot 312 to the target device 318. After the plurality of replication requests 304 are added to the replication queue in the replication unit 314, the replication unit 314 sends the replication requests 304 in the replication queue to the transmission unit 316 in sequence (as shown by the arrow line ①), and the transmission unit 316 receives the replication requests 304 and sends the snapshot 312 to the target device 318 via the replication requests 304 (as shown by the arrow line ②). After receiving the snapshot 312, the target device 318 sends feedback information to the transmission unit 316 (as shown by the arrow line ③), and the transmission unit 316 sends the feedback information to the replication unit 314 (as shown by the arrow line ④).

Still refer to FIG. 3, after the replication unit 314 receives the feedback information, it may determine that the current replication request 304 has been processed, and it may release the space occupied by that replication request 304 and continue to process the next replication request. As can be seen, the replication request 304 is processed between the replication unit 314 and the transmission unit 316 by means of synchronous replication. Since the space is released and the processing of the next replication request continues only after the current replication request 304 has been processed, no transmission queue exists in the transmission unit 316, and a replication queue is provided only in the replication unit 314 to cache the plurality of replication requests 304.

Figure 4:
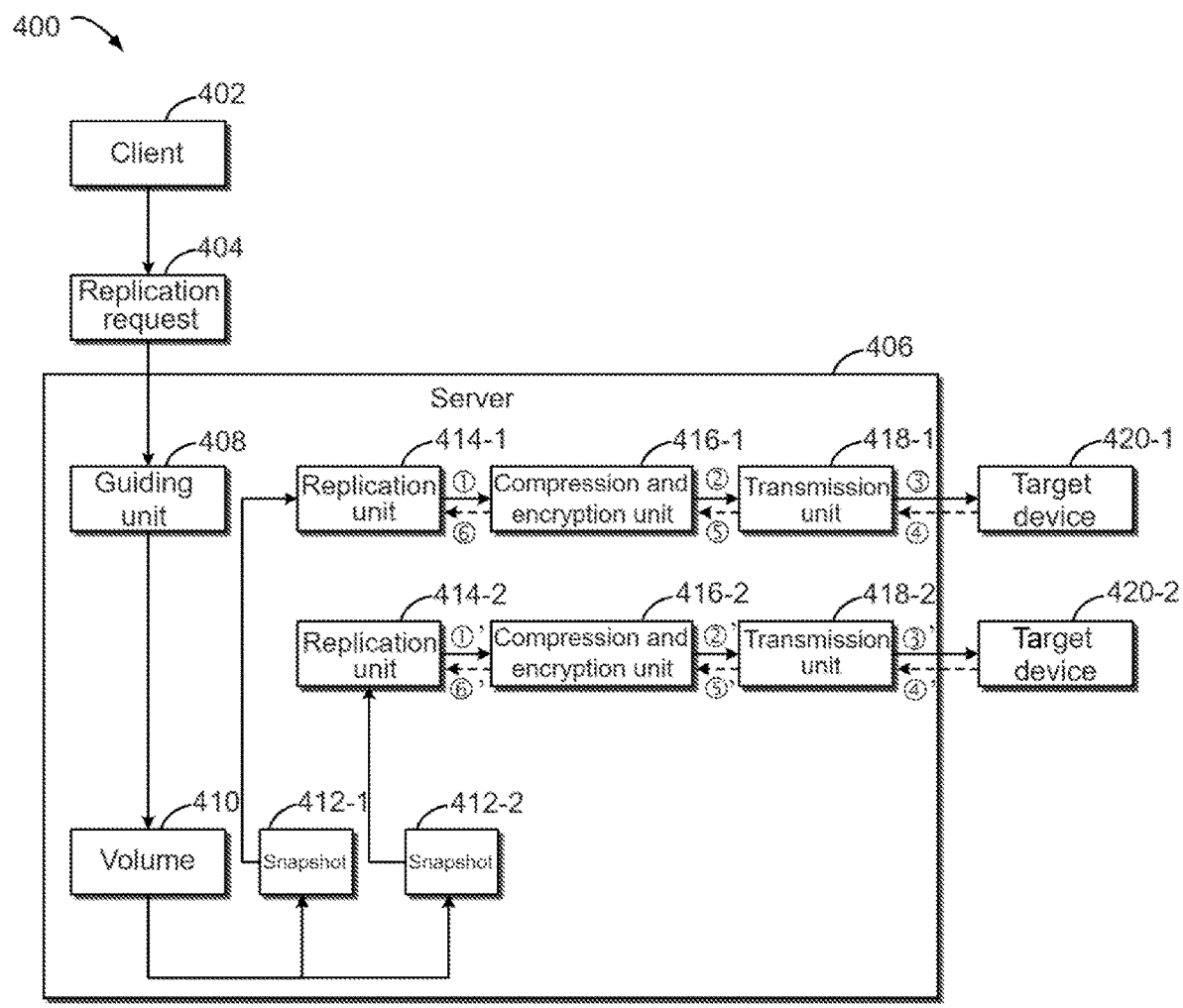
FIG. 4 illustrates a schematic diagram of a process of transmitting replicated data to a plurality of target devices via a plurality of transmission units according to some embodiments of the present disclosure.

FIG. 4 illustrates a schematic diagram of a process 400 of transmitting replicated data to a plurality of target devices via a plurality of transmission units according to some embodiments of the present disclosure. When the number of target devices for backing up data is multiple, a plurality of transmission units need to be provided separately for the plurality of target devices, and a plurality of replication units and a plurality of snapshots need to be provided separately for the plurality of transmission units. Referring to FIG. 4, in some embodiments, a replication request 404 is generated during use of a client 402, and a server 406 guides the replication request 404 to a volume 410 (which may be referred to as a storage space) by a guiding unit 408, so as to acquire a snapshot (which may be referred to as replicated data) in the volume 410.

Still refer to FIG. 4, a replication queue is provided in a replication unit 414-1 to cache a plurality of replication requests 404, and the replication unit 414-1 acquires a snapshot 412-1 through the replication request 404 in the replication queue and sends the replication request 404 to a compression and encryption unit 416-1 (as shown by the arrow line ①). The compression and encryption unit 416-1 is used to perform compression processing or encryption processing on the replication request 404, and send the compressed or encrypted replication request 404 to the transmission unit 418-1 (as shown by the arrow line ②). The transmission unit 418-1 sends the snapshot 412-1 to a target device 420-1 based on the replication request 404 (as shown by the arrow line ③), thereby completing the replication of the snapshot 412-1 from the server 406 to the target device 420-1.

Still refer to FIG. 4, the target device 420-1 receives the snapshot 412-1 and then sends feedback information to the transmission unit 418-1 (as shown by the arrow line ④). The transmission unit 418-1 receives the feedback information and then sends it to the compression and encryption unit 416-1 (as shown by the arrow line ⑤), and the compression and encryption unit 416-2 sends the feedback information to the replication unit 414-1 (as shown by the arrow ⑥). The replication unit 414-1, after receiving the feedback information, determines that the current replication request 404 has been processed, and then releases the space occupied by the replication request 404 and continues to process the next replication request. As can be seen, similar to that in FIG. 3, the replication request 404 is processed between the replication unit 414-1 and the transmission unit 418-1 by means of synchronous replication.

Still refer to FIG. 4, a replication queue is provided in a replication unit 414-2 to cache a plurality of replication requests 404, and the replication unit 414-2 acquires a snapshot 412-2 through the replication request 404 in the replication queue and sends the replication request 404 to a compression and encryption unit 416-2 (as shown by the arrow line ①'). The compression and encryption unit 416-2 is used to perform compression processing or encryption processing on the replication request 404, and send the compressed or encrypted replication request 404 to the transmission unit 418-2 (as shown by the arrow line ②'). The transmission unit 418-2 sends the snapshot 412-2 to the target device 420-2 based on the replication request 404 (as shown by the arrow line ③'), thereby completing the replication of the snapshot 412-2 from the server 406 to the target device 420-2.

Still refer to FIG. 4, the target device 420-2 receives the snapshot 412-2 and then sends feedback information to the transmission unit 418-2 (as shown by the arrow line ④'). The transmission unit 418-2 receives the feedback information and then sends it to the compression and encryption unit 416-2 (as shown by the arrow line ⑤'), and the compression and encryption unit 416-2 sends the feedback information to the replication unit 414-2 (as shown by the arrow ⑥'). The replication unit 414-2, after receiving the feedback information, determines that the current replication request 404 has been processed, and then releases the space occupied by the replication request 404 and continues to process the next replication request. As can be seen, similar to that in FIG. 3, the replication request 404 is processed between the replication unit 414-2 and the transmission unit 418-2 by means of synchronous replication.

In this way, the replicated data can be transmitted to a plurality of target devices at the same time. Moreover, since each target device has an independent replication branch in the server 406, in the case where network delays are different, data transmission to each target device can be performed based on its own transmission speed without interfering with each other. However, for each transmission unit, the server 406 needs to provide a separate replication branch for it so as to perform operations such as reading of snapshots, compression and encryption of replication requests, and so on, so excessive storage and computational resources are consumed in the server 406. For target devices with different replication time intervals, since different replication units cannot read the same snapshot at the same point in time, the provision of a plurality of snapshots, a plurality of replication units, and a plurality of compression and encryption units cannot be avoided. Further, in the case where the replication time intervals are the same, the snapshot in the volume 410 is read several times and compressed or encrypted several times, which also leads to the waste of computational resources and storage and thus affects the performance of the server 406.

Figure 5:
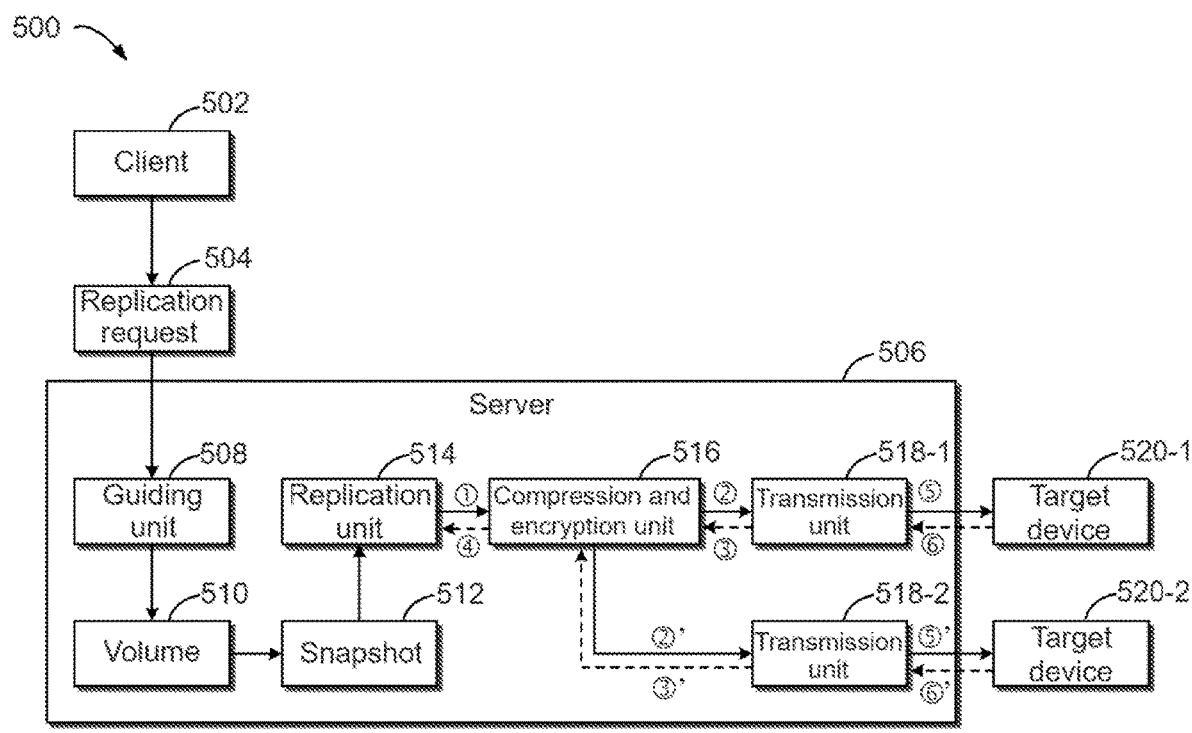
FIG. 5 illustrates a schematic diagram of another process of transmitting replicated data to a plurality of target devices via a plurality of transmission units according to some embodiments of the present disclosure.

FIG. 5 illustrates a schematic diagram of another process 500 of transmitting replicated data to a plurality of target devices via a plurality of transmission units according to some embodiments of the present disclosure. Referring to FIG. 5, in some embodiments, a replication request 504 is generated during use of a client 502, and a server 506 guides the replication request 504 to a volume 510 (which may be referred to as a storage space) by a guiding unit 508, so as to acquire a snapshot 512 (which may be referred to as replicated data) in the volume 510. A replication queue is provided in a replication unit 514 to cache a plurality of replication requests 504, and the replication unit 514 acquires a snapshot 512 by means of the replication requests 504 in the replication queue and sends the plurality of replication requests 504 in the replication queue to a compression and encryption unit 516 by means of parallel processing (as shown by the arrow line ①).

Still refer to FIG. 5, the compression and encryption unit 516, after receiving the plurality of replication requests 504, may compress or encrypt the plurality of replication requests 504 by means of parallel processing and send the compressed or encrypted plurality of replication requests 504 separately to a transmission unit 518-1 (as shown by the arrow line ②) and to a transmission unit 518-2 (as shown by the arrow line ②'). Then, the transmission unit 518-1 receives the replication request 504 and then sends feedback information to the compression and encryption unit 516 (as shown by the arrow line ③), and the transmission unit 518-2 receives the replication request 504 and then sends feedback information to the compression and encryption unit (as shown by the arrow line ③'). The compression and encryption unit 516, after receiving the feedback information sent by the transmission unit 518-1 and the transmission unit 518-2, may send the feedback information to the replication unit 514 (as shown by the arrow line ④).

Still refer to FIG. 5, the replication unit 514, after receiving the feedback information, may confirm that the plurality of replication requests in the replication queue have been added to the transmission unit 518-1 and the transmission unit 518-2, and then remove the plurality of replication requests 504 from the replication queue to release the space. When it is determined that the plurality of replication requests 504 have been removed from the replication queue, a next batch of replication requests (which may be referred to as a plurality of requests to be processed) may be acquired and added to the replication queue to continue parallel processing of the next batch of replication requests. It should be noted that the replication unit 514 in FIG. 5 can release the space occupied by the current plurality of replication requests 504 and continue to process the next batch of replication requests without waiting for the transmission unit 518-1 and the transmission unit 518-2 to send the snapshot 512 to the target device 520-1 and the target device 520-2; therefore, the plurality of replication requests 504 are processed between the replication unit 514 and the transmission unit 518-1 as well as the transmission unit 518-2 by means of asynchronous replication.

Still refer to FIG. 5, the transmission unit 518-1 is provided with a transmission queue for caching a set of replication requests. When the compression and encryption unit sends the replication request 504 to the transmission unit 518-1, the transmission unit 518-1 adds the replication request 504 to the transmission queue, and processes the set of replication requests by means of parallel processing, for example, sending the snapshot 512 to the target device 520-1 by means of the replication request 504 (as shown by the arrow line ⑤). The target device 520-1 receives the snapshot 512 and then sends feedback information to the transmission unit 518-1 (as shown by the arrow line ⑥). The transmission unit 518-1, after receiving the feedback information, determines that the current replication request 504 has been processed, removes the replication request 504 from the transmission queue to release the space, and continues to acquire the next replication request from the compression and encryption unit 516.

Still refer to FIG. 5, the transmission unit 518-2 is provided with a transmission queue for caching a set of replication requests. When the compression and encryption unit sends the replication request 504 to the transmission unit 518-2, the transmission unit 518-2 adds the replication request 504 to the transmission queue, and processes the set of replication requests by means of parallel processing, for example, sending the snapshot 512 to the target device 520-2 by means of the replication request 504 (as shown by the arrow line ⑤'). The target device 520-2 receives the snapshot 512 and then sends feedback information to the transmission unit 518-2 (as shown by the arrow line ⑥'). The transmission unit 518-2, after receiving the feedback information, determines that the current replication request 504 has been processed, removes the replication request 504 from the transmission queue to release the space, and continues to acquire the next replication request from the compression and encryption unit 516.

In this manner, it is possible to avoid separately providing a corresponding snapshot, replication unit, and compression and encryption unit for each transmission unit in the server 506; instead, it is possible to interface with a plurality of transmission units, such as the transmission unit 518-1 and the transmission unit 518-2, only through the common snapshot 512, replication unit 514, and compression and encryption unit 516, which saves the computational resources and storage resources of the server 506. Moreover, since the space required by the snapshot, the replication unit, and the compression and encryption unit is substantially reduced, more space can be allocated to the plurality of transmission queues, thereby ensuring the stability when the transmission unit transmits data to the target object.

In addition, since the plurality of replication requests 504 are processed between the replication unit 514 and the transmission unit 518-1 as well as the transmission unit 518-2 by means of asynchronous replication, when the network delay between one of the transmission units and the target device, such as between the transmission unit 518-1 and the target device 520-1, is high, although congestion of requests occurs in the transmission queue in the transmission unit 518-1 because the current replication request 504 cannot be processed (i.e., the snapshot 512 cannot be sent to the target device 520-1), the replication queue in the replication unit 514 does not experience congestion since the replication unit 514 will not wait until the snapshot 512 has been sent to the target device 520-1 before continuing to process the next batch of replication requests, and thus the data transmission between the transmission unit 518-2 and the target device 520-2 is not affected. Therefore, in the presence of network delays in some of the target devices, the server 506 can still ensure the stability of data transmission to other target devices, which means that the target devices will not affect each other due to network delays.

Figure 6:
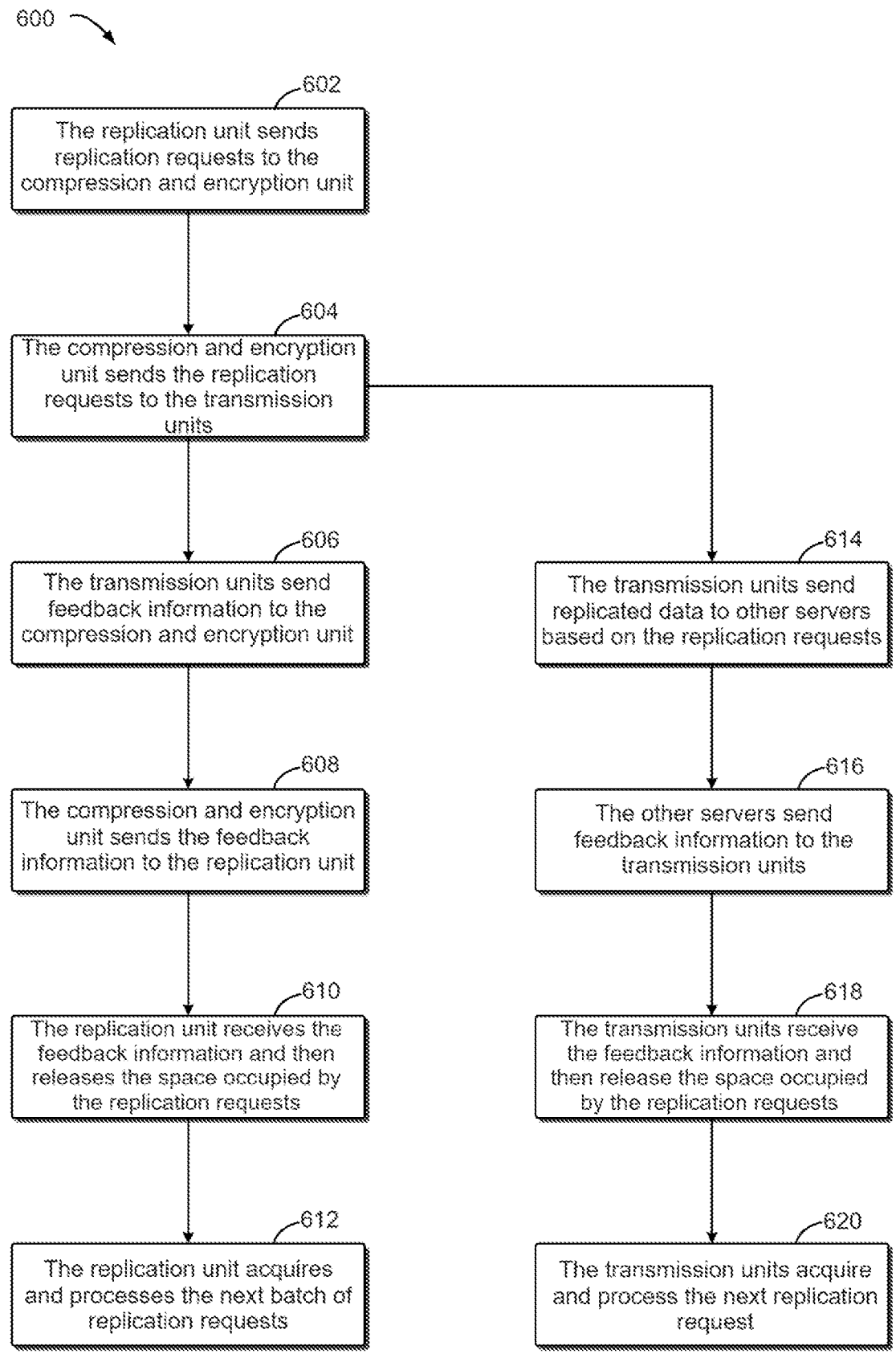
FIG. 6 illustrates a flow chart of a method for processing a replication request according to some embodiments of the present disclosure.

FIG. 6 illustrates a flow chart of a method 600 for processing a replication request according to some embodiments of the present disclosure. For example, the replication unit in FIG. 6 may be set as the replication unit 514 in FIG. 5, the compression and encryption unit may be set as the compression and encryption unit 516 in FIG. 5, the transmission units may be set as the transmission unit 518-1 and the transmission unit 518-2 in FIG. 5, and other servers may be set as the target device 520-1 and the target device 520-2 in FIG. 5.

With reference to FIG. 6, at block 602, the replication unit sends replication requests to the compression and encryption unit. The replication unit is provided with a replication queue for caching a plurality of replication requests, and the replication unit may send the replication requests to the compression and encryption unit by means of parallel processing. At block 604, the compression and encryption unit sends the replication requests to the transmission units. The compression and encryption unit compresses or encrypts the plurality of replication requests by means of parallel processing, and sends the plurality of replication requests separately to the plurality of transmission units by means of parallel processing.

Still refer to FIG. 6, at block 606, the transmission units send feedback information to the compression and encryption unit. The plurality of transmission units, after receiving the replication requests, send feedback information to the compression and encryption unit to confirm receipt of the replication requests. At block 608, the compression and encryption unit sends the feedback information to the replication unit. At block 610, the replication unit receives the feedback information and then releases the space occupied by the replication requests. The replication unit, after receiving the feedback information, may confirm that the plurality of replication requests have been processed, at which time the plurality of replication requests may be removed from the replication queue. At block 612, the replication unit acquires and processes the next batch of replication requests. After removing the plurality of replication requests from the replication queue, the replication unit can continue to acquire and process the next batch of replication requests.

Still refer to FIG. 6, at block 614, the transmission unit sends replicated data to other servers based on the replication requests. The plurality of transmission units, after receiving the replication requests, may send the replicated data to a plurality of other servers (which may be referred to as target devices) based on the replication requests. At block 616, the other servers send feedback information to the transmission units. The other servers, upon receiving the replicated data, send feedback information to the transmission units to confirm receipt of the replicated data. At block 618, the transmission units receive the feedback information and then release the space occupied by the replication requests. The transmission units, after receiving the feedback information, may confirm that the plurality of replication requests have been processed, so as to release the space occupied by the plurality of replication requests. At block 620, the transmission units acquire and process the next replication request. After the transmission units remove the current replication request, they can continue to acquire and process the next replication request.

In some embodiments, network delays between the transmission queue and the target devices may be determined to determine the buffer capacity required by that transmission queue. It is understandable that when the network delays are low, the replication requests are processed fast, so the replication requests are not easy to pile up in the transmission queue, and when the network delays are high, the replication requests are processed slowly, so the replication requests are easy to pile up in the transmission queue. Therefore, the higher the network delays, the higher the buffer capacity required by the transmission queue. In some embodiments, the network delays are in a linear relationship with the buffer capacity of the transmission queue. In some embodiments, the total buffer capacity required may be calculated by using a plurality of buffer capacities of a plurality of transmission queues.

In some embodiments, the network delays between the plurality of transmission queues and the plurality of target devices are classified into low network delays (which may be referred to as a first delay level), medium network delays (which may be referred to as a second delay level), and high network delays (which may be referred to as a third delay level). When there are low network delays with all target devices, the total capacity required is a low-delay total capacity (which can be referred to as a first total buffer capacity); when there are medium network delays with all target devices, the total capacity required is a medium-delay total capacity (which can be referred to as a second total buffer capacity); and when there are high network delays with all target devices, the total capacity required is a high-delay total capacity (which can be referred to as a third total buffer capacity).

Then, the proportion of low-delay transmission queues (which may be referred to as a first transmission queue proportion) that is at low network delays, the proportion of medium-delay transmission queues (which may be referred to as a second transmission queue proportion) that is at medium network delays, and the proportion of high-delay transmission queues (which may be referred to as a third transmission queue proportion) that is at high network delays in the actual network environment are determined. The product result of the low-delay transmission queue proportion and the low-delay total capacity, the product result of the medium-delay transmission queue proportion and the medium-delay total capacity, and the product result of the high-delay transmission queue proportion and the high-delay total capacity are calculated, and the above product results are added together to obtain the total buffer capacity actually required by the plurality of transmission queues.

In this way, the total buffer capacity required by the plurality of transmission queues as well as the buffer capacity of the transmission queues at each network delay level can be quickly determined, which ensures the accuracy of configuring the buffer capacity for the transmission queues, thus enabling each transmission queue to be adapted to the corresponding network environment while avoiding the waste of storage resources, and thus improving the accuracy and efficiency of transmitting replicated data to the target devices.

In some embodiments, in the process of adding the replication requests from the current replication queue (which may be referred to as a first replication queue) to the plurality of transmission queues, an addition failure may occur. For example, when the transmission unit 518-1 illustrated in FIG. 5 is experiencing link congestion or is not connectable, it is not possible to add the replication request 504 to the transmission queue corresponding to the transmission unit 518-1. In this scenario, since the processing of the current replication request cannot be completed, other replication requests will also be piled up in the replication queue together, so that new replication requests cannot be added to the replication queue any further.

Therefore, during the current replication time interval, it is necessary to set up a new replication queue (which may be referred to as a second replication queue), acquire the other replication requests in the current replication queue and add them to this new replication queue, and then continue to process other replication requests in this new replication queue in order to send the other replication requests to the remaining plurality of transmission queues to which the additions have not failed. At the same time, it is also necessary to retain the current replicated data for resuming processing of replication requests that failed to be added. When the problem with the transmission queue is solved, the current replication queue continues to process replication requests that failed to be added in order to add them to the corresponding transmission queues and redetermine whether they have been added successfully.

In this way, when a problem occurs with a transmission queue such as the transmission queue in the transmission unit 518-1 in FIG. 5, it is possible to quickly switch to another replication queue to continue processing, which avoids the failure to back up data to target devices as a result of congestion in the current replication queue and improves the fault tolerance rate of data replication, thereby improving the accuracy and stability of backing up data to the plurality of target devices.

In some embodiments, if the current replication queue and the new replication queue can send all the replication requests to the plurality of transmission queues within the same replication time interval, it indicates that the network condition has been restored within a short period of time, at which time the new replication queue can be merged into the current transmission queue. Processing of a plurality of replication requests continues in subsequent replication time intervals through the merged transmission queue.

Figure 7:
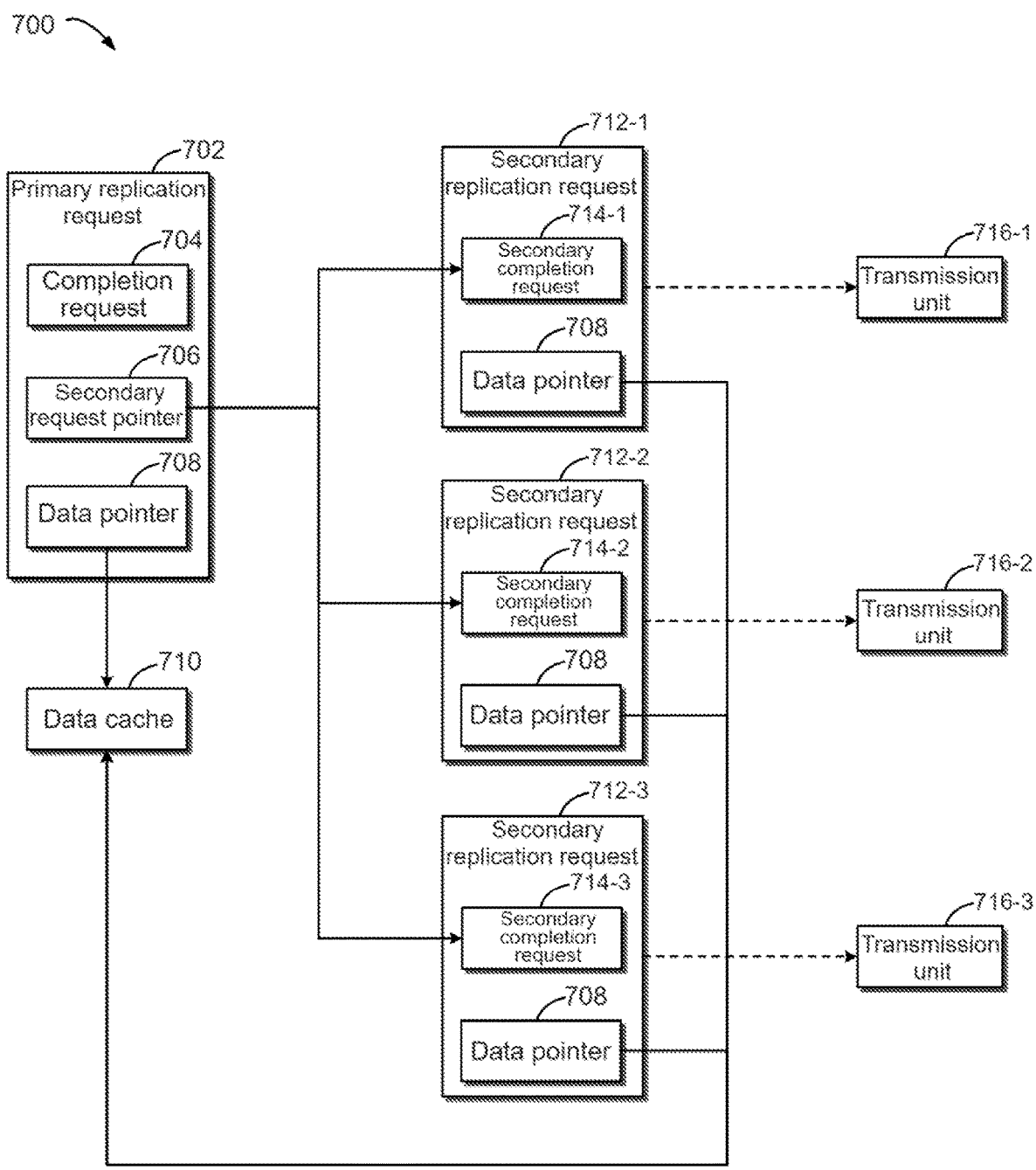
FIG. 7 illustrates a schematic diagram of a process for processing a replication request according to some embodiments of the present disclosure.

FIG. 7 illustrates a schematic diagram of a process 700 for processing a replication request according to some embodiments of the present disclosure. In some embodiments, the data structure of a primary replication request 702 (which may be referred to as the initial replication request) includes a completion request 704, a secondary request pointer 706, and a data pointer 708, wherein the data pointer 708 is used to point to a data cache 710 so as to acquire replicated data such as the snapshot 512 in FIG. 5, and the secondary request pointer 706 is used to point to a secondary replication request 712-1, a secondary replication request 712-2, and a secondary replication request 712-3. The secondary replication request 712-1 includes a secondary completion request 714-1 and a data pointer 708, the secondary replication request 712-2 includes a secondary completion request 714-2 and a data pointer 708, the secondary replication request 712-3 includes a secondary completion request 714-3 and a data pointer 708, and the secondary replication request 712-1, the secondary replication request 712-2, and the secondary replication request 712-3 correspond to a transmission unit 716-1, a transmission unit 716-2, and a transmission unit 716-3, respectively.

Still refer to FIG. 7, after the secondary replication request 712-1, the secondary replication request 712-2, and the secondary replication request 712-3 are generated by replication based on the primary replication request 702, the secondary replication request 712-1, the secondary replication request 712-2, and the secondary replication request 712-3 are sent to the corresponding transmission unit 716-1, transmission unit 716-2, and transmission unit 716-3, respectively. Taking the secondary replication request 712-1 as an example, when the secondary replication request 712-1 is sent to the transmission unit 716-1, the secondary completion request 714-1 may be processed, and when feedback is received with respect to the secondary completion request 714-1, it may be confirmed that the secondary replication request 712-1 has been processed. At this point, the pointer corresponding to the secondary replication request 712-1 may be removed from the secondary request pointer 706.

Still refer to FIG. 7, if the secondary replication request 712-1, the secondary replication request 712-2, and the secondary replication request 712-3 are all sent to the transmission unit 716-1, the transmission unit 716-2, and the transmission unit 716-3, all three pointers in the secondary request pointer 706 are removed, and at this point, the number of pointers in the secondary request pointer is zero, at which time the completion request 704 can be processed. After feedback for the completion request 704 is received, it may be confirmed that the processing of the primary replication request 702 is completed, then the space occupied by the primary replication request 702 and the secondary replication request 712-1, the secondary replication request 712-2, and the secondary replication request 712-3 may be released. In this process, if there is a secondary replication request that fails to be sent, the primary replication request 702 cannot confirm the completion of the processing, at which time the secondary replication request that fails to be sent as well as the corresponding transmission unit are stripped from the process 700, and the processing is redone after the factors that caused the sending failure have been eliminated.

In this manner, after the secondary replication requests are all sent to the transmission units, the completion request 704 can be directly executed when the number in the secondary request pointer 706 is 0, so that it can be determined that the primary replication request 702 has been processed, thereby improving the completion efficiency of the primary replication request 702. Moreover, if there is a secondary replication request that fails to be sent, the secondary replication request that fails to be sent can be quickly located via the pointer in the secondary request pointer 706, and the corresponding transmission unit can be stripped off in a timely manner, thereby improving the efficiency of responding to and dealing with system problems.

In some embodiments, both the replication queue and the transmission queue require the data buffer capacity for parallel processing of the plurality of replication requests, and the concurrency of the plurality of replication requests is dependent on the size of the data buffer capacity. In general, the maximum size of a replication request is 64 KB. For ease of description and calculation, the size of all replication requests below is set to 64 KB.

In some embodiments, for the process 400 in FIG. 4, each replication unit is set to have a data buffer capacity of 4 MB, and the total number of replication units is 32, so the total buffer capacity required by the plurality of replication units in the server 406 is 128 MB, and the number of replication requests 404 that can be processed concurrently in each replication unit is 64. In addition, the server 406 allocates a total buffer capacity of 40 MB for the transmission services of the plurality of transmission queues, including the buffer capacity corresponding to completion requests, the buffer capacity corresponding to data pointers, and the buffer capacity corresponding to data caches (also referred to as replicated data), etc., as illustrated in FIG. 7. For the convenience of description and calculation, the buffer capacity corresponding to the data cache is set to 1 MB in each transmission unit, so that the total buffer capacity of the plurality of transmission units with respect to the replicated data is 32 MB.

Then, the process of transmitting replicated data from the server 406 to the plurality of target devices is tested with respect to the parameters set forth above, and the test parameters include: ① the total buffer capacity of the transmission units, ② the replication request size, ③ the buffer capacity of each transmission unit, ④ the maximum number of replication requests being processed, ⑤ the network delay, ⑥ the number of IO requests (which can be referred to as replication requests) processed per second in a single thread (Input/Output Operations Per Second, or IOPS for short), ⑦ the number of IO requests processed per second in the bus thread, and ⑧ the total bandwidth.

Further, the relationship between the above parameters is as follows: the buffer capacity of each transmission unit is the ratio of the total buffer capacity of the transmission units to the number of transmission units or replication units; the maximum number of replication requests being processed is the ratio of the total buffer capacity of the transmission units to the replication request size; the number of IO requests processed per second in a single thread is the ratio of 1 second to the network delay; the number of IO requests processed per second in the bus thread is the product result of the maximum number of replication requests being processed and the number of IO requests processed per second in a single thread; and the total bandwidth is the product result of the number of IO requests processed per second in the bus thread and the replication request size. The example test results are as follows:

| ① | ② | ③ | ④ | ⑤ | ⑥ | ⑦ | ⑧ |
|---|---|---|---|---|---|---|---|
| 32 MB | 64 KB | 1 MB | 512 | 10 ms | 100 | 50K | 3200 MBps |
| 32 MB | 64 KB | 1 MB | 512 | 40 ms | 25 | 12.5K | 800 MBps |
| 32 MB | 64 KB | 1 MB | 512 | 100 ms | 10 | 5K | 320 MBps |

According to the example test results, during the transmission of replicated data from the server 406 to the plurality of target devices, when the network environment is at a low delay, the number of IO requests processed per second in the bus thread can reach 20,000 to 30,000, and the total bandwidth can reach 1,280 MBps to 1,920 MBps. It is understandable that, in practical scenarios, the actual transmission performance of the server 406 can be higher than the test performance. The reason for this is that the network delays of different target devices are different, and in practical scenarios, different buffer capacities are often allocated to the corresponding plurality of transmission units according to the network delays of different target devices, instead of allocating the same buffer capacity to each transmission unit during the test.

In some embodiments, for the process 400 in FIG. 4, the above test contents are adjusted so that the buffer capacity of the transmission unit is adapted to the network delay. In a low-delay network environment, a smaller buffer capacity can be set for the transmission unit, which was set to 512 KB during the test. In medium network delays, a medium buffer capacity can be set for the transmission unit, which was set to 2 MB during the test. In high network delays, a high buffer capacity can be set for the transmission unit, which was set to 4 MB during the test. It is understandable that since the buffer capacity of each transmission unit changes while the total buffer capacity of the transmission units remains unchanged, the maximum amounts of concurrency of the transmission units in low, medium, and high network delays also become 64, 16, and 8 in that order.

Then, the following test parameters are set for the test process, including: ① the total buffer capacity of the transmission units, ② the replication request size, ③ the buffer capacity of each transmission unit, ④ the maximum number of replication requests being processed, ⑤ the network delay, ⑥ the number of IO requests processed per second in a single thread, and ⑦ the maximum amount of concurrency. Among them, the maximum amount of concurrency is the ratio of the total buffer capacity of the transmission units to the buffer capacity of each transmission unit, and is used as the maximum number of transmission units or replication units. The specific test results are as follows:

| ① | ② | ③ | ④ | ⑤ | ⑥ | ⑦ |
|---|---|---|---|---|---|---|
| 32 MB | 64 KB | 512 KB | 512 | 10 ms | 100 | 64 (>32) |
| 32 MB | 64 KB | 2 MB | 512 | 40 ms | 25 | 16 (<32) |
| 32 MB | 64 KB | 4 MB | 512 | 100 ms | 10 | 8 (<32) |

According to the test results, since the total buffer capacity of the transmission units is fixed at 32 MB, when the network delay is low, the buffer capacity of the transmission unit is 512 KB, at which time the server 406 can support up to 64 transmission units or replication units, which can meet the demand of simultaneous data transmission to 32 target devices. When the network delay is medium or high, the buffer capacities of the transmission unit are 2 MB and 4 MB, respectively, and at this time, the server can support up to 16 and 8 transmission units and replication units, which cannot meet the demand of simultaneous data transmission to 32 target devices.

By way of the process 400 in FIG. 4, although it is possible to adjust the buffer capacity of the transmission unit under different network delay conditions, the total buffer capacity that the transmission units can be allocated is fixed and small since the plurality of replication units and the plurality of compression and encryption units occupy a large buffer capacity. Therefore, in environments with medium or high network delays, if each transmission unit requires a large buffer capacity, the number of target devices that can be supported is reduced. Meanwhile, for low network delay environments, the space occupied by a plurality of transmission units is higher than the actual need, resulting in a waste of storage resources.

In some embodiments, with respect to the process 500 in FIG. 5, since the replication requests 504 are processed between the replication unit 514 and the plurality of transmission units by means of asynchronous replication, the buffer capacities of the replication unit 514 and the plurality of transmission units may be allocated in accordance with the actual demand without setting a fixed buffer capacity. Moreover, since there is no network switching between the replication unit 514 and the plurality of transmission units, the processing of the replication request 504 can still be completed in less than 1 ms even when the processing time of the compression and encryption unit 516 is included. Thus, for each transmission unit, the number of IO requests processed per second in its single thread is 1 s/1 ms=1000.

Then, in order to achieve the amount of 20 k in the above test, the amount of concurrency during concurrent processing of the replication requests 504 in the replication unit 514 needs to reach 20. Therefore, the buffer capacity in the replication unit 514 is 20 times the replication request size, i.e., 1280 KB, and thus the total buffer capacity in the replication unit 514 is 40 MB, which is much smaller than the 128 MB in the previous testing process. As a result, more buffer capacity can be allocated to the plurality of transmission units. The test parameters include: ① the total buffer capacity of the transmission units, ② the replication request size, ③ the buffer capacity of each transmission unit, ④ the maximum number of replication requests being processed, ⑤ the network delay, ⑥ the number of IO requests (which can be referred to as replication requests) processed per second in a single thread, ⑦ the number of IO requests processed per second in the bus thread, and ⑧ the total bandwidth. The specific test results are as follows:

| ① | ② | ③ | ④ | ⑤ | ⑥ | ⑦ | ⑧ |
|---|---|---|---|---|---|---|---|
| 16 MB | 64 KB | 512 KB | 256 | 10 ms | 100 | 25K | 1600 MBps |
| 64 MB | 64 KB | 2 MB | 1024 | 40 ms | 25 | 25K | 1600 MBps |
| 128 MB | 64 KB | 4 MB | 2048 | 100 ms | 10 | 20K | 1280 MBps |

Based on the test results, it is possible to allocate a buffer capacity to each transmission unit more rationally and, with the number of IOs processed per second in the bus thread remaining unchanged, to improve the network bandwidth in medium- and high-delay network environments and to avoid the waste of storage resources in low-delay network environments. It is understandable that, in practical scenarios, the number of IOs processed per second in the bus thread as well as the total bandwidth may not change linearly with storage capacity, but there will be a noticeable improvement. In addition, during the test process, the maximum value of the total buffer capacity required by the replication unit 514 and the plurality of transmission units is 40 MB+128 MB=168 MB, which is substantially the same as the total buffer capacity during the previous test process for the process 400. As a result, since the replication unit 514 requires a reduced buffer capacity, the server 506 can better support concurrent data transmission to 32 target devices.

Through the approach in the process 500 in FIG. 5, the buffer capacity of the replication unit 514 can be transferred to the plurality of transmission units, the reason for which is that the transmission for the replication unit 514 is stable, while the network environments for the transmission units are different. As can be seen from the above test results, the total buffer capacity of the plurality of transmission units can vary from 16 MB to 128 MB, with the exact value depending on how many target devices are in low network delays, how many target devices are in medium network delays, and how many target devices are in high network delays. Moreover, each transmission unit can set a more accurate buffer capacity according to the specific network delay, thus improving the stability of data transmission by the server 506 under different network environments.

In some embodiments, the total buffer capacity of the plurality of transmission units is set to be 16 MB when all target devices are in low network delays, the total buffer capacity of the plurality of transmission units is set to be 64 MB when all target devices are in medium network delays, and the total buffer capacity of the plurality of transmission units is set to be 128 MB when all target devices are in high network delays. For example, when 31.25% of the transmission units are in low network delays, 31.25% of the transmission units are in medium network delays, and 37.5% of the transmission units are in high network delays, the total buffer capacity required by all the transmission units at this time is: 31.25%*16 MB+31.25%*64 MB+37.5%*128 MB=73 MB. In addition, when one of the transmission units cannot be added with the replication request, this transmission unit can be stripped off and a new replication unit can be assigned. For example, if the new replication unit has a buffer capacity of 50% of the original replication unit, the total buffer capacity required by the replication unit as well as the plurality of transmission units at this time is: 73 MB+40*150%=113 MB, which is still less than the 160 MB required in the process 400 during the test.

Figure 8:
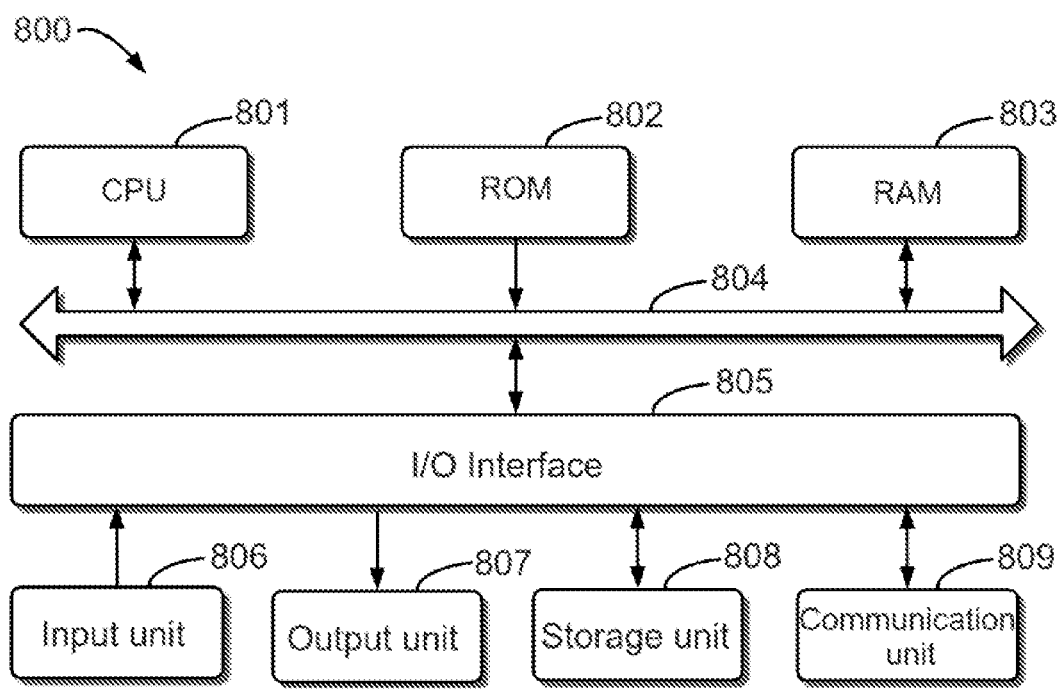
FIG. 8 illustrates a block diagram of a device that can implement some embodiments of the present disclosure.

FIG. 8 illustrates a block diagram of a device 800 that can implement some embodiments of the present disclosure. As illustrated in FIG. 8, the device 800 includes a computing unit 801 that can execute various appropriate actions and processing according to computer program instructions stored in a read-only memory (ROM) 802 or computer program instructions loaded from a storage unit 808 to a random access memory (RAM) 803. Various programs and data required for the operation of the device 800 may also be stored in the RAM 803. The computing unit 801, the ROM 802, and the RAM 803 are connected to each other through a bus 804. An input/Output (I/O) interface 805 is also connected to the bus 804.

A plurality of components in the device 800 are connected to the I/O interface 805, including: an input unit 806, such as a keyboard and a mouse; an output unit 807, such as various types of displays and speakers; a storage unit 808, such as a magnetic disk and an optical disc; and a communication unit 809, such as a network card, a modem, and a wireless communication transceiver. The communication unit 809 allows the device 800 to exchange information/data with other devices via a computer network, such as the Internet, and/or various telecommunication networks.

The computing unit 801 may be various general-purpose and/or special-purpose processing components with processing and computing capabilities. Some examples of the computing unit 801 include, but are not limited to, central processing units (CPUs), graphics processing units (GPUs), various specialized artificial intelligence (AI) computing chips, various computing units for running machine learning model algorithms, digital signal processors (DSPs), and any appropriate processors, controllers, microcontrollers, etc. The computing unit 801 performs various methods and processes described above, such as the method 200. For example, in some embodiments, the method 200 may be implemented as a computer software program that is tangibly included in a machine-readable medium, such as the storage unit 808. In some embodiments, part or all of the computer program may be loaded and/or installed onto the device 800 via the ROM 802 and/or the communication unit 809. When the computer program is loaded to the RAM 803 and executed by the computing unit 801, one or more steps of the method 200 described above may be performed. Alternatively, in other embodiments, the computing unit 801 may be configured to implement the method 200 in any other suitable manners (such as by means of firmware).

The functions described herein above may be performed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combinations thereof. Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter recited in the appended claims is not necessarily limited to the particular features or actions described above. Rather, the specific features and actions described above are merely example forms of implementing (or supporting) the claims.

The invention claimed is:

1. A method for transmission of replicated data, comprising:
    acquiring the replicated data from a storage space based on a plurality of replication requests in a replication queue;
    determining whether the plurality of replication requests are added to a plurality of transmission queues from the replication queue;
    removing the plurality of replication requests from the replication queue in response to the plurality of replication requests being added to the plurality of transmission queues from the replication queue;
    transmitting the replicated data to a plurality of target devices based on the plurality of replication requests in the plurality of transmission queues;
    acquiring a plurality of network delays between the plurality of transmission queues and the plurality of target devices;
    determining a plurality of buffer capacities of the plurality of transmission queues based on the plurality of network delays; and
    determining a total buffer capacity of the plurality of transmission queues based on the plurality of buffer capacities.

2. The method according to claim 1, further comprising:
    acquiring a plurality of requests to be processed; and
    determining, in response to the plurality of replication requests being added to the plurality of transmission queues from the replication queue, that the plurality of replication requests are removable from the replication queue without waiting until a plurality of pieces of feedback information is received from the plurality of target devices; and
    adding the plurality of requests to be processed to the replication queue in response to the plurality of replication requests being removed from the replication queue.

3. The method according to claim 2, further comprising:
    determining whether feedback information is received from the target devices; and
    removing the replication requests from the transmission queues in response to receiving the feedback information from the target devices.

4. The method according to claim 1, wherein transmitting the replicated data to the target devices comprises:
    transmitting a set of replicated data to the target devices by means of parallel processing based on a set of replication requests in the transmission queues.

5. The method according to claim 1, wherein the plurality of network delays are classified into a first delay level, a second delay level, and a third delay level, and determining the total buffer capacity of the plurality of transmission queues comprises:
    determining a first transmission queue proportion corresponding to the first delay level, a second transmission queue proportion corresponding to the second delay level, and a third transmission queue proportion corresponding to the third delay level; and
    determining the total buffer capacity based on a product result of the first transmission queue proportion and a first total buffer capacity corresponding to the first delay level, a product result of the second transmission queue proportion and a second total buffer capacity corresponding to the second delay level, and a product result of the third transmission queue proportion and a third total buffer capacity corresponding to the third delay level.

6. The method according to claim 1, wherein the replication queue is a first replication queue, and the method further comprises:
    acquiring other replication requests in the first replication queue in response to a failure to add a replication request in the first replication queue to at least one transmission queue among the plurality of transmission queues;
    adding the other replication requests in the first replication queue to a second replication queue; and determining whether the other replication requests in the second replication queue are added to the plurality of transmission queues.

7. The method according to claim 6, further comprising:
saving the replicated data in response to a failure to add the replication request to the at least one transmission queue among the plurality of transmission queues; and
redetermining whether the replication request in the first replication queue is added to the plurality of transmission queues.

8. The method according to claim 7, further comprising:
determining whether the replication request in the first replication queue and the other replication requests in the second replication queue are added to the plurality of transmission queues within the same replication time interval; and
merging the second replication queue into the first replication queue in response to the replication request in the first replication queue and the other replication requests in the second replication queue being added to the plurality of transmission queues within the same replication time interval.

9. The method according to claim 1, wherein determining whether the plurality of replication requests are added to the plurality of transmission queues from the replication queue comprises:
determining whether a replication request among the plurality of replication requests is added to a transmission queue among the plurality of transmission queues;
removing, in response to the replication request among the plurality of replication requests being added to the transmission queue among the plurality of transmission queues, a pointer among a plurality of pointers in an initial replication request that corresponds to the transmission queue among the plurality of transmission queues; and
determining, in response to no pointer existing in the initial replication request, that the plurality of replication requests are added to the plurality of transmission queues.

10. An electronic device, comprising:
at least one processor; and
a memory coupled to the at least one processor and having instructions stored thereon, wherein the instructions, when executed by the at least one processor, cause the electronic device to perform actions comprising:
acquiring the replicated data from a storage space based on a plurality of replication requests in a replication queue;
determining whether the plurality of replication requests are added to a plurality of transmission queues from the replication queue;
removing the plurality of replication requests from the replication queue in response to the plurality of replication requests being added to the plurality of transmission queues from the replication queue; and
transmitting the replicated data to a plurality of target devices based on the plurality of replication requests in the plurality of transmission queues;
wherein the replication queue is a first replication queue, and the actions further comprise:
acquiring other replication requests in the first replication queue in response to a failure to add a replication request in the first replication queue to at least one transmission queue among the plurality of transmission queues;
adding the other replication requests in the first replication queue to a second replication queue; and
determining whether the other replication requests in the second replication queue are added to the plurality of transmission queues.

11. The device according to claim 10, further comprising:
acquiring a plurality of requests to be processed; and
determining, in response to the plurality of replication requests being added to the plurality of transmission queues from the replication queue, that the plurality of replication requests are removable from the replication queue without waiting until a plurality of pieces of feedback information is received from the plurality of target devices; and
adding the plurality of requests to be processed to the replication queue in response to the plurality of replication requests being removed from the replication queue.

12. The device according to claim 11, further comprising:
determining whether feedback information is received from the target devices; and
removing the replication requests from the transmission queues in response to receiving the feedback information from the target devices.

13. The device according to claim 10, wherein transmitting the replicated data to the target devices comprises:
transmitting a set of replicated data to the target devices by means of parallel processing based on a set of replication requests in the transmission queues.

14. The device according to claim 10, further comprising:
acquiring a plurality of network delays between the plurality of transmission queues and the plurality of target devices;
determining a plurality of buffer capacities of the plurality of transmission queues based on the plurality of network delays; and
determining a total buffer capacity of the plurality of transmission queues based on the plurality of buffer capacities.

15. The device according to claim 14, wherein the plurality of network delays are classified into a first delay level, a second delay level, and a third delay level, and determining the total buffer capacity of the plurality of transmission queues comprises:
determining a first transmission queue proportion corresponding to the first delay level, a second transmission queue proportion corresponding to the second delay level, and a third transmission queue proportion corresponding to the third delay level; and
determining the total buffer capacity based on a product result of the first transmission queue proportion and a first total buffer capacity corresponding to the first delay level, a product result of the second transmission queue proportion and a second total buffer capacity corresponding to the second delay level, and a product result of the third transmission queue proportion and a third total buffer capacity corresponding to the third delay level.

16. The device according to claim 10, further comprising:
saving the replicated data in response to a failure to add the replication request to the at least one transmission queue among the plurality of transmission queues; and
redetermining whether the replication request in the first replication queue is added to the plurality of transmission queues.

17. The device according to claim 16, further comprising:
determining whether the replication request in the first replication queue and the other replication requests in the second replication queue are added to the plurality of transmission queues within the same replication time interval; and merging the second replication queue into the first replication queue in response to the replication request in the first replication queue and the other replication requests in the second replication queue being added to the plurality of transmission queues within the same replication time interval.

18. A computer program product having a non-transitory computer readable medium which stores a set of instructions to transmit replicated data; the set of instructions, when carried out by computerized circuitry, causing the computerized circuitry to perform a method of:

acquiring the replicated data from a storage space based on a plurality of replication requests in a replication queue;

determining whether the plurality of replication requests are added to a plurality of transmission queues from the replication queue;

removing the plurality of replication requests from the replication queue in response to the plurality of replication requests being added to the plurality of transmission queues from the replication queue; and transmitting the replicated data to a plurality of target devices based on the plurality of replication requests in the plurality of transmission queues;

wherein determining whether the plurality of replication requests are added to the plurality of transmission queues from the replication queue comprises:

determining whether a replication request among the plurality of replication requests is added to a transmission queue among the plurality of transmission queues;

removing, in response to the replication request among the plurality of replication requests being added to the transmission queue among the plurality of transmission queues, a pointer among a plurality of pointers in an initial replication request that corresponds to the transmission queue among the plurality of transmission queues; and determining, in response to no pointer existing in the initial replication request, that the plurality of replication requests are added to the plurality of transmission queues.

19. The computer program product according to claim 18, wherein the method further comprises:

acquiring a plurality of network delays between the plurality of transmission queues and the plurality of target devices;

determining a plurality of buffer capacities of the plurality of transmission queues based on the plurality of network delays; and determining a total buffer capacity of the plurality of transmission queues based on the plurality of buffer capacities.

20. The computer program product according to claim 18, wherein the replication queue is a first replication queue, and the method further comprises:

acquiring other replication requests in the first replication queue in response to a failure to add a replication request in the first replication queue to at least one transmission queue among the plurality of transmission queues;

adding the other replication requests in the first replication queue to a second replication queue; and determining whether the other replication requests in the second replication queue are added to the plurality of transmission queues.

* * * * *